(12) United States Patent
Burger

(10) Patent No.: US 10,040,517 B2
(45) Date of Patent: Aug. 7, 2018

(54) LOCKING GIMBAL

(71) Applicant: Henri Louis Burger, Cape Town (ZA)

(72) Inventor: Henri Louis Burger, Cape Town (ZA)

( * ) Notice: Subject to any disclaimer, the term of this patent is extended or adjusted under 35 U.S.C. 154(b) by 31 days.

(21) Appl. No.: 15/129,205

(22) PCT Filed: Mar. 25, 2015

(86) PCT No.: PCT/ZA2015/000016
§ 371 (c)(1),
(2) Date: Sep. 26, 2016

(87) PCT Pub. No.: WO2015/149087
PCT Pub. Date: Oct. 1, 2015

(65) Prior Publication Data
US 2017/0120992 A1 May 4, 2017

(30) Foreign Application Priority Data
Mar. 26, 2014 (ZA) .................................. 2014/02240

(51) Int. Cl.
*F16M 11/24* (2006.01)
*B63B 29/12* (2006.01)
(Continued)

(52) U.S. Cl.
CPC ........... *B63B 29/12* (2013.01); *F16M 11/205* (2013.01); *F16M 2200/024* (2013.01); *G04B 41/00* (2013.01)

(58) Field of Classification Search
CPC ....... B63B 29/12; B63B 29/10; F16M 11/205; F16M 2200/024; F16M 2200/047;
(Continued)

(56) References Cited

U.S. PATENT DOCUMENTS

| 284,879 | A | * | 9/1883 | Merrill ................... B63B 29/12 |
| | | | | 114/192 |
| 926,665 | A | | 6/1909 | MacKinnon |

(Continued)

FOREIGN PATENT DOCUMENTS

| EP | 0154240 | 9/1982 |
| GB | 8163 | 4/1901 |

(Continued)

OTHER PUBLICATIONS

Search Report and Written Opinion for international application No. PCT/ZA2015/000016 dated Nov. 11, 2015.
(Continued)

*Primary Examiner* — Christopher Garft
(74) *Attorney, Agent, or Firm* — Haugen Law Firm PLLP

(57) ABSTRACT

This invention relates to a locking gimbal (10). More specifically, the invention relates to a locking gimbal (10) for automatically locking a gimballed object against motion arising from an external force ($F_E$) applied thereto; and automatically releasing the gimballed object on removal of the external force ($F_E$). The locking gimbal (10) includes a first object (12) pivotable about a first pivot axis ($P_F$), a second object (14) movable along an arc cantered substantially at a second axis, a locking member (16) and a locking formation (18). The first object (12) defines a first reference axis ($A_{RF}$) passing through the first pivot axis ($P_F$) and a center of gravity ($CG_F$) of the first object (12), whereas the second object (14) defines a second reference axis ($A_{RS}$) passing through the second axis and a center of gravity ($CG_S$) of the second object (14). The first and second objects (12, 14) are movable relative to one other between a first aligned condition, wherein the first and second reference axes ($A_{RF}$, $A_{RS}$) are substantially aligned, and a second displaced condition, wherein the first and second reference axes ($A_{RF}$, $A_{RS}$) are angularly displaced relative to one other.
(Continued)

The locking formation (18), actuated by displacement between the first and second objects (12,14) is radially movable relative to the first pivot axis ($P_F$) between engaged and disengaged position, wherein: (i) in the first aligned condition, the locking formation (18) is in a disengaged position and spaced from the locking member (16), permitting rotation of the first object (12) about the first pivot axis ($P_F$); and (ii) in the second displaced condition, the locking formation (18) is in an engaged position and in contact with the locking member (16) thereby preventing rotation of the first object (12) about the first pivot axis ($P_F$).

21 Claims, 7 Drawing Sheets

(51) Int. Cl.
*F16M 11/20* (2006.01)
*G04B 41/00* (2006.01)

(58) Field of Classification Search
CPC .............. F16M 2200/041; G04B 41/00; B63C 2009/023; B63C 2009/026
USPC ................................ 248/188.3; 114/191, 351
See application file for complete search history.

(56) References Cited

U.S. PATENT DOCUMENTS

| | | | |
|---|---|---|---|
| 1,978,425 | A | 10/1934 | Gillmor |
| 3,576,134 | A | 4/1971 | Fersht |
| 6,257,125 | B1 | 7/2001 | Pate |
| 6,850,222 | B1 | 2/2005 | Rosenberg |
| 7,040,680 | B2 | 5/2006 | Grinsted |
| 8,033,197 | B2 | 10/2011 | Larson et al. |
| 2012/0273537 | A1 | 11/2012 | Newman |

FOREIGN PATENT DOCUMENTS

| | | |
|---|---|---|
| GB | 190629527 | 12/1907 |
| GB | 13181 | 3/1908 |
| GB | 22130 | 2/1910 |
| GB | 21985 | 9/1910 |
| GB | 191104509 | 12/1911 |
| GB | 292684 | 6/1928 |
| GB | 1104260 | 2/1968 |
| GB | 1382514 | 2/1975 |
| GB | 2074752 | 11/1981 |
| GB | 16306 | 10/1989 |
| JP | 6214502 | 1/1987 |
| JP | 63124974 | 5/1988 |
| JP | 2007022349 | 2/2007 |
| WO | 2004067373 | 8/2004 |

OTHER PUBLICATIONS

Supplementary European Search Report dated Nov. 7, 2017 in related European application serial No. 15770215.0.

\* cited by examiner

LOCKING GIMBAL

BACKGROUND OF THE INVENTION

THIS invention relates to locking gimbal. More specifically, the invention relates to a locking gimbal for: automatically locking a gimballed object against motion arising from an external force applied thereto; and automatically releasing the gimballed object on removal of the external force.

It is well known that objects such as stoves, ovens, tables, beds, etc. upon transportation craft (i.e. boats, automobiles, trains or aeroplanes) are often gimballed in order for them to remain substantially level despite the rocking motion of the craft. In order for these gimballed objects to remain level, they must be able to swing freely, which is inherently dangerous.

It will be appreciated that it is very possible for a person to accidentally bump into or fall onto the gimballed object thereby exposing it to an external direct load and throwing it and anything supported thereon out of a level condition. In the case of a gimballed stove supporting a pot of boiling water, such an event would certainly cause severe injuries. One solution implemented to counter this danger is a manual mechanical lock, which locks the gimballed object against any motion. Although the locked gimballed object is locked against motion arising from exposure to an external direct load, it is incapable of self-levelling and as such, remains dangerous under the rocking motion of the craft.

It is therefore an object of the present invention to provide a locking gimbal that allows the gimballed object to swing freely to self-level, but to automatically lock in the event of the gimballed object being exposed to an external direct load that would otherwise force it from a level condition.

SUMMARY OF THE INVENTION

According to the invention there is provided a locking gimbal including:
  a first object pivotally connectible to a support, and being pivotable about a first pivot axis, wherein the center of gravity of the first object is spaced from the first pivot axis, and further wherein the first object defines a first reference axis passing through the first pivot axis and the center of gravity of the first object;
  a second object having a center of gravity movable along an arc centered substantially at a second axis and defining a second reference axis passing through the second axis and the center of gravity of the second object, the first and second objects being movable relative to one another between a first aligned condition, wherein the first and second reference axes are substantially aligned, and a second displaced condition, wherein the first and second reference axes are angularly displaced relative to one another;
  a locking member fixed in position relative to the support; and
  a locking formation for locking the first object wherein the locking formation, actuated by displacement between the first and second objects, is radially movable relative to the first pivot axis between engaged and disengaged positions, wherein, when:
    (i) the first and second objects are in the first aligned condition, the locking formation is in the disengaged position in which the locking formation is spaced from the locking member, permitting rotation of the first object about the first pivot axis; and
    (ii) the first and second objects are in the second displaced condition, the locking formation is in the engaged position in which the locking formation makes contact with the locking member and prevents rotation of the first object about the first pivot axis.

Generally, the first object is biased towards an in rest position in which a support surface of the first object is substantially level. Typically, the first object is biased toward the in rest position in which the center of gravity of the first object operatively comes to rest at a position underneath the pivot support.

In the in rest position, the first reference axis is preferably substantially upright, the first object being biased towards the in rest position under its own weight or under the weight of a first counterweight connected thereto such that the first object acts as a first pendulum. It will be appreciated that the term "substantially upright" will be understood to mean vertical or any angular offset from vertical of up to 30 degrees either side of vertical.

In one embodiment of the invention, the second object may be movable along a track connected to the first object, with the second object being capable of rolling or sliding along the track. Typically, the track is arcuate. Preferably, the track is arced having a center located substantially at the second axis, and further wherein the second axis is substantially co-linear with the first pivot axis.

Typically, the locking formation is one or more formations on a locking arm pivotally mounted on the first object and pivotally movable relative thereto from the disengaged position into the engaged position by contact of the second object thereon in the displaced condition.

In a first alternative embodiment of the invention, the second object is pivotally supported to act as a second pendulum, and the locking formation is a terminal end of one or more locking pins being movable between the engaged and disengaged positions. In the engaged position, the locking pin generally extends such that the locking formation thereof comes into engagement with the locking member when the first and second objects are in the second displaced condition. In the disengaged position, the locking pin is typically retracted such that the locking formation thereof is spaced from the locking member when the first and second objects are in the first aligned condition.

The locking gimbal may include one or more connectors for driving the locking pins between the respective disengaged and engaged positions, the connector being co-operative between the first object or the second object, and the locking pin such that when the first and second objects are in the first aligned position, the locking pin is forced by the connector into the retracted disengaged position, and when the first and second objects are in the second displaced position, the locking pin is forced by the connector into the extended engaged position.

Generally, the locking pin is slidably mounted on the first object and the connector comprises first and second ends, each of the ends being pivotally connected to the locking pin and to the second object respectively. Preferably, the locking pin is slidably mounted on the first object within guides such that an axis along which the locking pin is slidable remains substantially parallel with the first reference axis.

In a second alternative embodiment of the invention, the locking gimbal may have at least two locking pins slidably mounted on the first or second object, each being capable of actuation by one of the respective connectors, the connectors each having first and second ends wherein the first ends thereof are pivotally connected to one of the respective locking pins and the second ends thereof being configured to co-operatively engage the first object thereby to transmit, on engagement between the first object and the respective second ends of the connectors in the first aligned and second displaced conditions, a corresponding force imparted onto the connectors by the first object to the locking pins such that the respective locking pin is driven towards the retracted disengaged or extended engaged positions respectively.

In a third alternative embodiment of the invention, the locking gimbal may have at least two locking pins slidably mounted on the first or second object, and connectors in the form of a plurality of gears for driving the locking pins, the gears being co-operatively engagable with the first object thereby to transmit, on engagement between the first object and at least one of the gears in the first aligned or second displaced conditions, a corresponding force imparted on the gears by the first object to the locking pins such that the respective locking pin is driven into the retracted disengaged or extended engaged positions.

Preferably, the locking pins are slidably mounted on the first or second object within guides such that axes along which the locking pins are slidable remain substantially parallel with the respective first or second reference axis. More preferably, the second object is pivotally supported about the first pivot axis on the support, or about the second axis located on a secondary support, the second axis being a second pivot axis.

In a fourth alternative embodiment of the invention, the second object is pivotally supported on the first object and pivotable relative thereto about the second axis, the second axis being a second pivot axis spaced from the first pivot axis.

The locking formation may be a locking pin configured to ride between a cog formation on the second object and the locking member, with the locking pin capable of riding freely along the locking member between in the disengaged position, when the first and second objects are in the first aligned condition.

In the engaged position, when the first and second objects are in the second displaced condition, the locking pin is captured between projections on the cog formation and the locking member, thereby to lock the first and second objects to the locking member and prevent rotation of the first object about the first pivot axis.

In a fifth alternative embodiment of the invention, the second object may be pivotally supported about the second axis to act as a second pendulum such that the second axis is a second pivot axis, and further wherein the locking formation is one or more formations on a locking arm, the locking arm being pivotally mounted on the first object and pivotable relative thereto about a third pivot axis.

Generally, the locking gimbal includes one or more connectors having first and second ends, the first end thereof being pivotally connected to a first connection point on the locking arm and a second end thereof being pivotally connected to a second connection point on the second object, wherein the first connection point and the third pivot axis lie on a primary plane and the second connection point and the second pivot axis lie on a secondary plane. Although not necessary, the primary and secondary planes, in use, remain substantially parallel throughout the range of pivotal movement of the first and second objects.

Typically, the center of gravity of the second object and the second pivot axis lie on a transverse plane being substantially perpendicular to the secondary plane. It will be appreciated that the second object may be pivotally supportable on a second support such that the first and second pivot axis are spaced relative to one another.

It will be further appreciated that the second object, acting as a second pendulum, comprises a second counterweight pivotally supported on a second pendulum arm.

To enable the locking gimbal to arrest oscillations, it is preferable that a first length, as measured between the first pivot axis and the center the gravity of the first object, and a second length, as measured between the axis about which the second object is pivotally supported and the center of gravity of the second object, are unequal such that a period of oscillation of the first object is different to a period of oscillation of the second object.

The center of gravity of the first object and the first pivot axis may lie on a transverse plane being substantially perpendicular to the support surface of the first object. The locking member is curved, preferably arced, and may have repeating projections spaced from one another circumferentially there along. More preferably, the center of the arced locking member coincides with the first pivot axis.

Preferably, the locking member is two or more spaced parallel locking members orientated relative to one another such that the projections on one of the locking members are staggered relative to the projections on the other locking members thereby increasing the engaging responsiveness of the locking formation on the locking member.

Generally, the locking formation is movably supported on the locking arm and movable relative thereto such that the locking formation engages the locking member in the engaged position and disengages the locking member in the disengaged position.

Typically, the locking formation is movably supported on a swivel pin on the locking formation or the locking arm, the swivel pin being captured within a swivel slot defined on the other of the locking formation or the locking arm. The swivel pin and swivel slot preferably enable the locking formation to swivel and slide relative to the locking arm, with the range of motion of the locking engagement member being limited by the length of the swivel slot and corresponding abutment formations capable of abutting one another in the engaged position.

The first pivot axis may be one of two or more gimbal axes about which the first object is pivotally supported, the at least two gimbal axes being angularly offset relative to one another thereby to maintain the first object and/or the support surface thereof substantially level. Preferably, the at least two gimbal axes are angularly offset relative to one another by 90 degrees.

Generally, wherein in the first aligned condition, the first and second reference axes are substantially co-planar and/or co-linear.

According to a second aspect of the invention, there is provided a gimbal object including a primary locking gimbal and at least a second locking gimbal wherein the first pivot axes of the respective primary and secondary locking gimbals are angularly offset relative to one another. Preferably, the first pivot axes of the respective primary and secondary locking gimbals are angularly offset relative to one another by about 90 degrees.

BRIEF DESCRIPTION OF THE DRAWINGS

The invention will now be described in more detail, by way of example only, with reference to the accompanying drawings in which.

DETAILED DESCRIPTION OF THE DRAWINGS

Figure 1A:
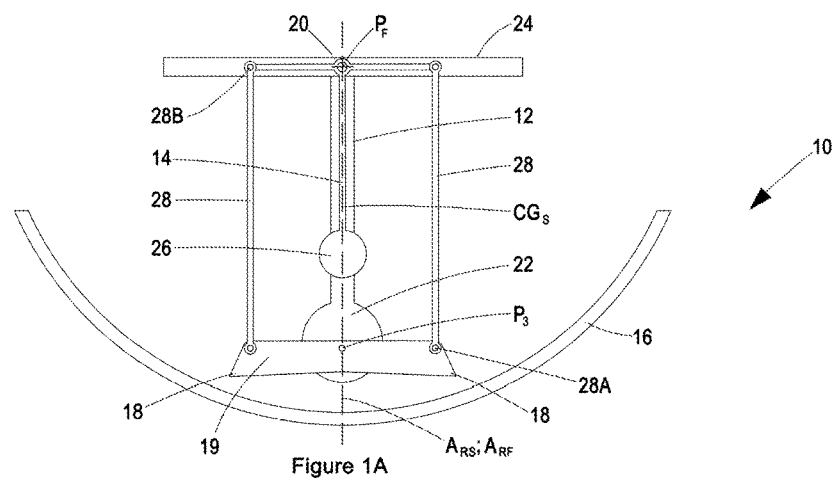
FIG. 1A-1C are side views of a preferred embodiment of a locking gimbal in accordance with the invention, FIGS. 1A and 1B showing the locking gimbal in first aligned conditions under motionless and in motion states respectively, with FIG. 1C showing the locking gimbal in a second displaced condition.
Figure 1B:
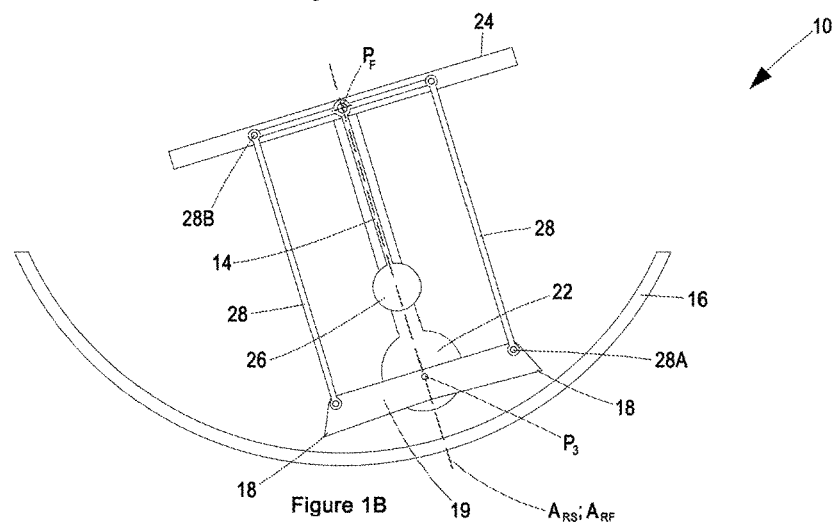
Figure 1C:
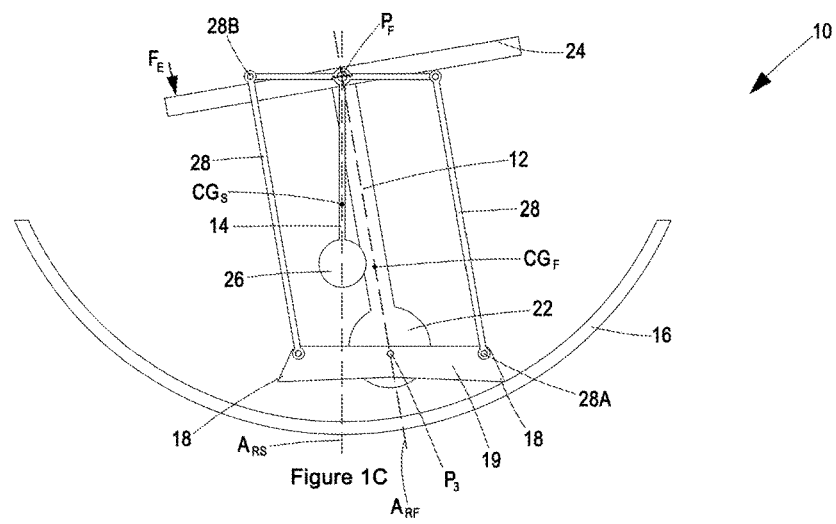

A locking gimbal according to a preferred embodiment of the invention is designated generally in the accompanying figures with reference numeral 10. With reference now to FIG. 1A to FIG. 1C, the locking gimbal 10 includes a first object 12, a second object 14, a locking member 16 and a locking formation 18.

Although the first and second objects 12,14 have been illustrated for the ease of description as substantially T-shaped first and second pendulums respectively, it will be appreciated that the first and second objects may take any form. For example, the first object 12 may in fact be a gimballed object (i.e. a stove) pivotally supported about a point spaced from its center of gravity.

Furthermore, although the locking gimbal 10 has been illustrated in the accompanying figures in respect of objects gimballed in a single plane, it will be appreciated that practically the objects may be gimballed on multiple planes with one or more locking gimbals 10 for locking the objects in one or more of the planes.

Turning back to the figures, the first object 12 is pivotally connectible to a support 20, for example a shaft, and pivotable thereon about a first pivot axis "$P_F$", with the center of gravity "$CG_F$" of the first object 12 spaced from the first pivot axis "$P_F$", to lie operatively below the first pivot axis "$P_F$".

As such, the first object 12 is biased under its own weight, or under the weight of a first counterweight 22, towards an in rest position in which the center of gravity "$CG_F$" of the first object 12 lies substantially vertically below the first pivot axis "$P_F$" with a support surface 24 of the first object 12 retained in a substantially level condition. The first object 12 defines a first reference axis "$A_{RF}$" passing through the first pivot axis "$P_F$" and the center of gravity "$CG_F$" of the first object 12.

The second object 14 is similarly pivotally connectible to the support 20 and pivotable thereon about the first pivot axis "$P_F$", with the center of gravity "$CG_s$" of the second object 14 spaced from the first pivot axis "$P_F$" to lie operatively below the first pivot axis "$P_F$". It will be appreciated that the second object 14, instead of being pivotally supported about the first pivot axis "$P_F$" may be supported about a second pivot axis spaced from the first pivot axis "$P_F$".

As such, the second object 14 is biased under its own weight, or under the weight of a second counterweight 26, towards an in rest position in which the center of gravity "$CG_s$" of the second object 14 lies substantially vertically below the first pivot axis "$P_F$". The second object 14 defines a second reference axis "$A_{Rs}$" passing through the first pivot axis "$F_F$" and the center of gravity "$CG_s$" of the second object 14.

The locking member 16 is arced having its center lying substantially on the first pivot axis "$P_F$" and being fixed in position relative to the support 20 such that the locking member 16 is restricted from movement. Preferably, the locking member 16 comprises repeating projections spaced from one another circumferentially there along as shown in FIG. 2C, in respect of an alternative embodiment of the invention.

The locking formations 18 are located on a locking arm 19 pivotally mounted on the first object 12 and pivotable relative thereto about a third pivot axis "$P_3$". Furthermore, the locking gimbal 10 includes one or more connectors 28 having first and second ends, the first ends thereof being pivotally connected to a first connection point 28A on the locking arm 18 and a second end thereof being pivotally connected to a second connection point 28B on the second object 14 to define a quadrangular pendulum structure.

The quadrangular pendulum structure is movable between a substantially rectangular form (as illustrated in FIG. 1A) and a substantially parallelogram form (as illustrated in FIG. 1C). In this manner a primary plane on which the first connection point 28A and the third pivot axis "$P_3$" lie, as well as a secondary plane on which the second connection point 28B and the first pivot axis "$P_F$" lie, remain substantially parallel throughout the range of pivotal movement of the first and second objects 12,14.

Although the quadrangular pendulum structure has been described and illustrated as being movable between substantially rectangular and parallelogram forms, it will be appreciated that it may instead be movable between any first and any second quadrangular forms, where the primary and secondary planes at not necessarily parallel.

With the components of the locking gimbal 10 configured as described, it will be appreciated that the first and second objects 12, 14 are movable relative to one another between a first aligned condition, wherein the first and second reference axes "$A_{RF}$, $A_{Rs}$" are substantially aligned (as shown in FIGS. 1A and 1B), and a second displaced condition, wherein the first and second axes "$A_{RF}$, $A_{Rs}$" are angularly displaced relative to one another (as shown in FIG. 1C).

It will be appreciated further from the configuration of the components of the locking gimbal 10 that locking formations 18 on the locking arm 19 are radially movable relative to the first pivot axis "$P_F$" between engaged and disengaged positions.

In the disengaged position, and with the first and second objects 12,14 in the first aligned condition (FIGS. 1A and 1B), the locking formations 18 are spaced from the locking member 16 permitting rotation of the first object 12 about the first pivot axis "$P_F$".

In the engaged position, and with the first and second objects 12,14 in the second displaced condition (FIG. 1C), the locking formations 18 make contact with the locking member 16 preventing rotation of the first object 12 about the first pivot axis "$P_F$".

In use, with the first and second objects 12,14 in the first aligned condition, the first object 12 is free to swing relative to the locking member 16 to enable the support surface 24 thereof to self-level into the in rest position. Although it may not be clear from the illustrations, FIG. 1A (as well as FIGS. 2A, 3A, 4A and 7A) illustrates the locking gimbal 10 in the first aligned condition in a motionless state, i.e. a boat supported on a trailer, whereas FIG. 1B (as well as FIGS. 2B, 3B, 4B and 7B) illustrates the locking gimbal 10 also in the first aligned condition, but in a state of motion, i.e. the boat rocking or yawing in a body of water.

With reference now to FIG. 1C, in the event of an external force "$F_E$" being applied to the first object 12, for example as a result of a crewman breaking his fall by contact with the support surface 24 of the first object 12, the first object 12 is displaced from the first aligned condition into the second displaced condition.

Consequently, the locking formation 18 on the locking arm 19 is radially moved from the disengaged position into the engaged position, with contact between the locking formation 18 and the locking member 16 preventing any further rotation of the first object 12 about the first pivot axis "$P_F$", thereby to counter the external force "$F_E$" and to retain, as far as possible, the support surface 24 in the level condition.

It will be appreciated that the parallelogram form that the quadrangular pendulum structure is capable of taking coincides with second displaced condition of the first and second objects 12, 14, and that release of the external force "$F_E$" from the first object 12 will cause the first and second objects 12, 14 to return to the first aligned condition, in which condition the quadrangular pendulum structure will return to the rectangular form.

Although not necessary, it is clear from the illustrations that a first length, as measured between the first pivot axis "$P_F$" and the center the gravity "$CG_F$" of the first object 12, and a second length, as measured between the first pivot axis "$P_F$" and the center of gravity "$CG_S$" of the second object 14, are unequal such that a period of oscillation of the first object 12 is different to a period of oscillation of the second object 14.

It will be appreciated that in many gimballed applications, the gimballed object is prone to oscillations. For example, a gimballed object aboard a waterborne boat is prone to induced oscillations by the wake of passing vessels, which can lead to the violent swinging of the gimballed object. It is envisaged that the different periods of oscillations of the first and second objects 12, 14, arising from unequal first and second lengths, will cause the first and second objects 12, 14 to swing out of synchronisation.

Consequently, the first and second objects 12, 14 are forced into the second displaced condition, placing the locking formations 18 into the engaged position, thereby locking the first object 12 against the locking member 16 and arresting such oscillations. Accordingly, the locking gimbal 10 is capable of arresting unwanted oscillations in addition to locking the first object 12 when exposed to an external force "$F_E$"

FIGS. 2A to 2D illustrates possible improvements to the locking gimbal 10 shown in FIGS. 1A to 1C. The improvements are the inclusion of a series of projections 30 spaced circumferentially along the locking member 16, and making the locking formation 18 movable on the locking arm 19. The projections 30 may be, amongst others, a series of posts, notches or teeth on a gear-like locking member 16.

The more closely spaced the projections 30, the greater the responsiveness of the locking effect of the locking gimbal 10. To further increase the responsiveness of the locking effect, and with reference to FIG. 2D, the locking gimbal may comprise a pair or more of locking formations 18, 18' co-operative with a pair of spaced parallel locking members 16, 16', the spaced parallel locking members 16, 16' orientated relative to one another such that the projections 30 on one of the locking members 16 are staggered relative to the projections 30' on the other locking member 16'.

The locking formation 18 is movably supported on a swivel pin 32 located on the locking arm 19 being captured within a swivel slot 34 defined by the locking formation 18. It will be appreciated that the location of the swivel pin and swivel slot could be swopped such that the swivel pin is located on the locking formation 18 and the swivel slot defined by the locking arm 19.

Co-operation between the swivel pin 32 and the swivel slot 34 enable the locking formation 18 to swivel and slide relative to the locking arm 19, with the range of motion of the locking formation 18 being limited by the length of the swivel slot 34 and corresponding abutment formations 36A, 36B located on the locking formation 18 and the locking arm 19 respectively.

Figure 2A:
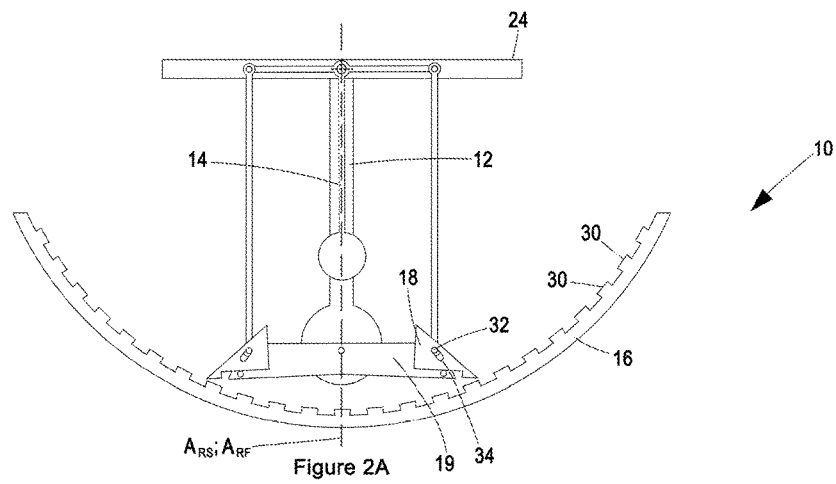
FIG. 2A-2D are side views of the locking gimbal of FIG. 1, having responsiveness and effectiveness enhancements included therein.
Figure 2B:
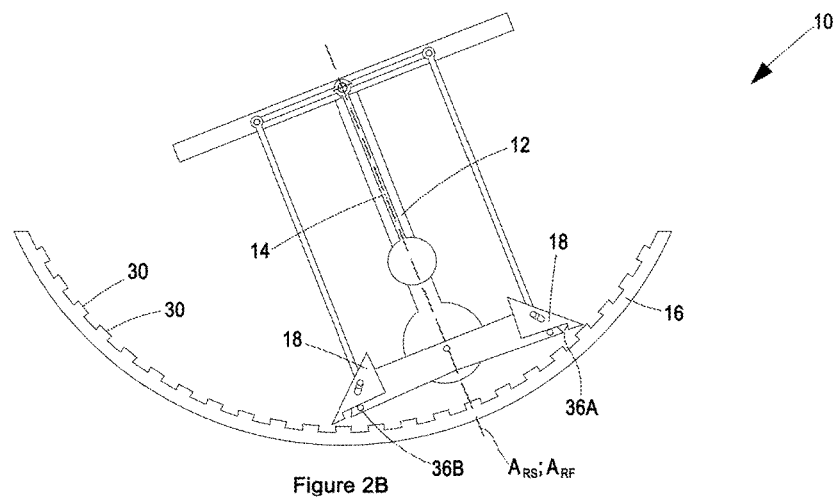
Figure 2C:
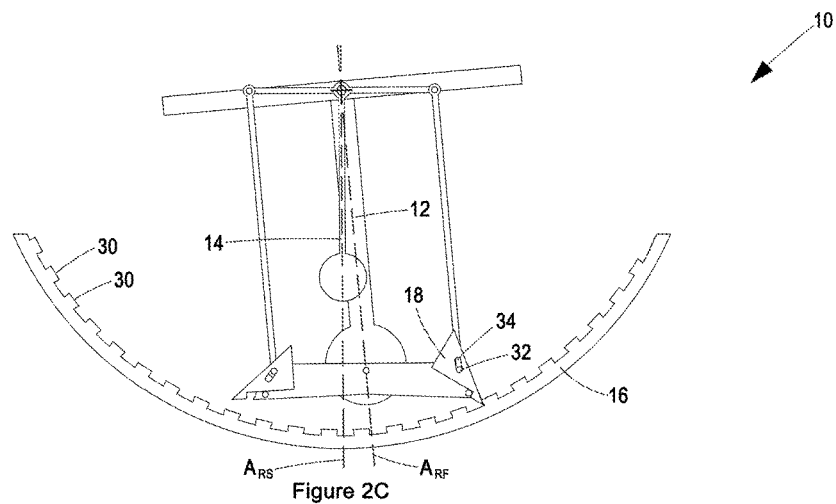
Figure 2D:
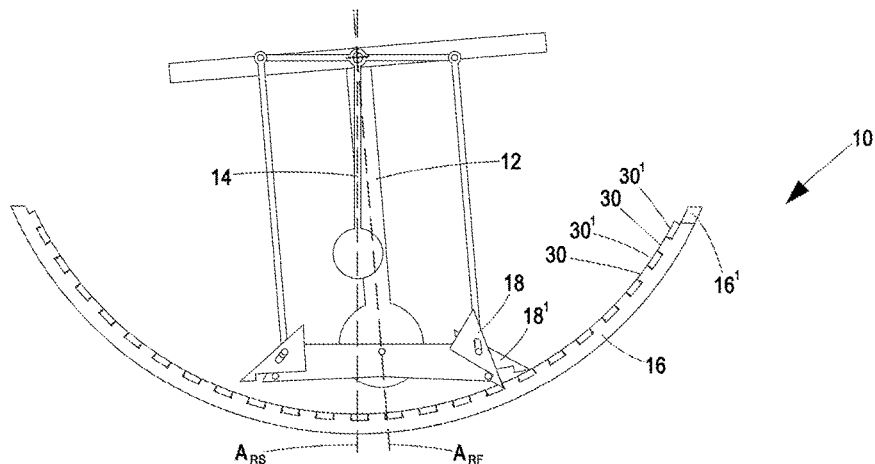

In use, with the first and second objects 12, 14 moving into the second displaced condition, the locking formation 18 swivels and slides along the swivel pin 32 from the disengaged position, wherein the locking formation 18 is raised from the locking member 16 as shown in FIGS. 2A and 2B, into the engaged position, wherein the locking formation is lowered into engagement with a projection 30 of the locking member 16, thereby to check further rotation of the first object 12 about the first pivot axis "$P_F$", as shown in FIG. 2C.

In this manner, with a greater surface area of the locking formation 18 coming into contact with the projection 30 of the locking member 16, the effectiveness of the locking effect of the locking gimbal 10 is greatly increased.

Figure 3A:
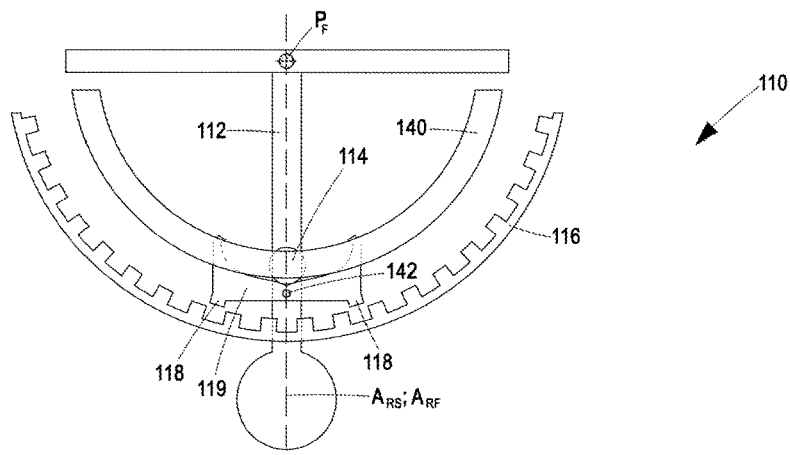
FIG. 3A-3C are side views of a second embodiment of a locking gimbal in accordance with the invention, FIGS. 3A and 3B showing the locking gimbal in first aligned conditions under motionless and in motion states respectively, with FIG. 3C showing the locking gimbal in a second displaced condition.
Figure 3B:
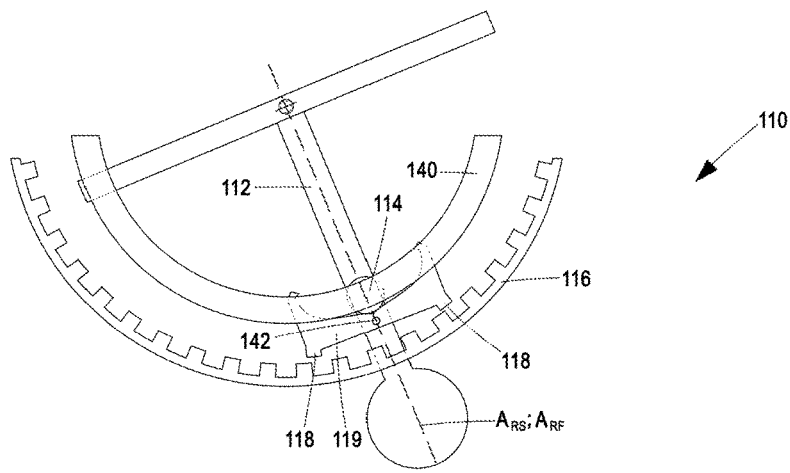
Figure 3C:
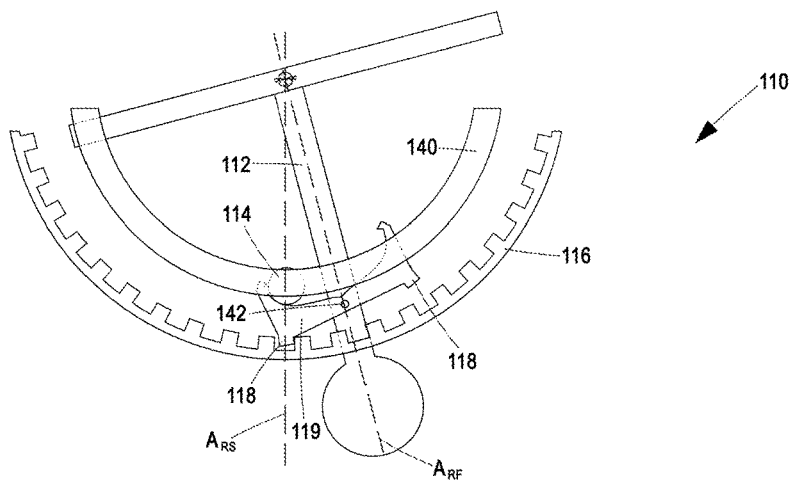

FIGS. 3A to 3C, with like references designating like parts, illustrates an alternative embodiment of the invention where instead of the second object being a pendulum, the second object 114 rolls or slides within a track 140. Preferably, the second object 114 is a rolling spherical weight 114, with the arced track fixed to the first object 112 having a center point substantially coinciding with the first pivot axis "$P_F$".

The locking formations 118 are located on a locking arm 119, pivotally supported on the first object 112 about a pivot support 142. In the first aligned condition, as illustrated in FIGS. 3A and 3B, the first object 112 is free to swing relative to the locking member 116.

It will be appreciated that the pivot support 142 may be configured on the locking arm 119 as illustrated in the accompanying figures, or such that it's center of gravity lies operatively below the pivot support 142, thereby enabling the locking arm 119 to automatically reset to the disengaged position with the first and second objects in the first aligned condition.

In the event of the first and second objects 112, 114 moving into the second displaced condition, the rolling spherical weight 114 abuts one of the upper sides of the locking arm 119 causing the locking arm 119 to pivot about the pivot support 142 such that the respective locking formation 118 is brought into the engaged position with the locking member 116, thereby to check further rotation of the first object 112 about the first pivot axis "$P_F$", as shown in FIG. 3C.

Figure 4A:
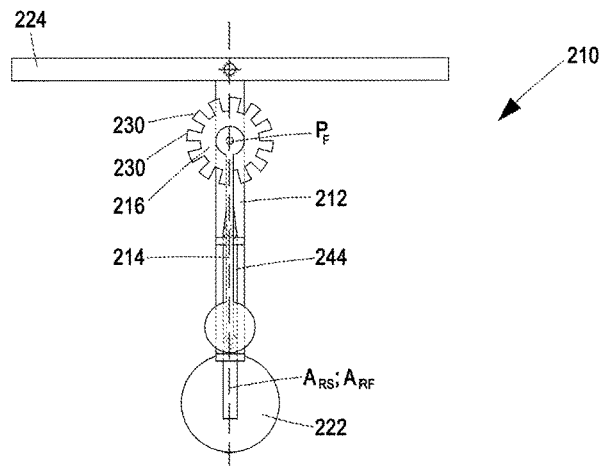
FIG. 4A-4C are side views of a third embodiment of a locking gimbal in accordance with the invention, FIGS. 4A and 4B showing the locking gimbal in first aligned conditions under motionless and in motion states respectively, with FIG. 4C showing the locking gimbal in a second displaced condition.
Figure 4B:
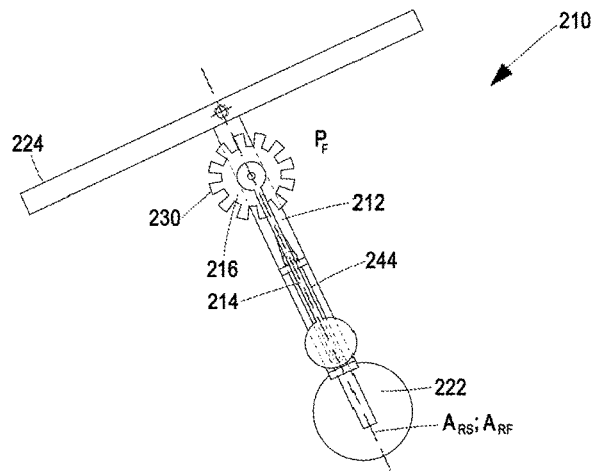
Figure 4C:
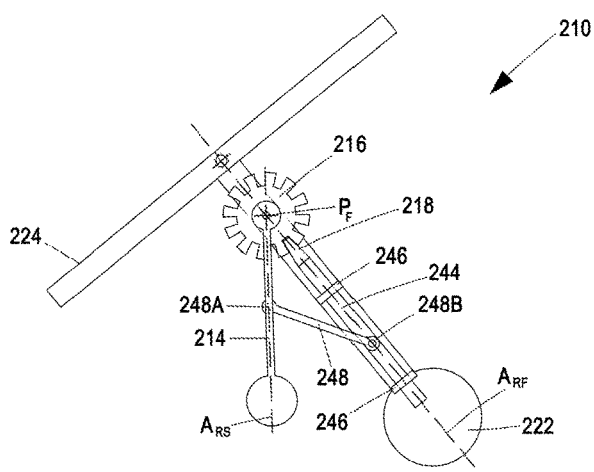

FIGS. 4A to 4C, with like references designating like parts, illustrates yet a further alternative embodiment of the invention where instead of having a concave locking member located proximate the free ends of the first and second pendulum-like objects 212, 214, the locking member 216 is convex or circular and located proximate the first pivot axis "$P_F$".

The locking formation 218 is a terminal end of a locking pin 244 being slidably mounted on the first object 212 by guides 246. The locking pin 244 being slidably movable between the disengaged and engaged positions. In the disengaged position, the locking formation 218 is retracted towards the first counterweight end 222 of the first object 212 and spaced from the locking member 216 as shown in FIGS. 4A and 4B.

In the engaged position, the locking formation 218 extends towards the locking member 216 to engage the projections 230 as shown in FIG. 4C. The locking pin 244 is actuated between the disengaged and engaged positions by a connector 248 pivotally connected at opposing ends 248A, 248B to the second object 214 and the locking pin 244 respectively.

In the first aligned condition, as illustrated in FIGS. 4A and 4B, the connector 248 retains the connection point 248B (as shown in FIG. 4C) at an initial spaced distance from the first pivot axis "$P_F$" such that the locking pin 244 is retained in the retracted disengaged position, allowing the first object 212 to swing freely relative to the locking member 216.

In the event of the first and second objects 212, 214 moving into the second displaced condition, the spaced distance between the connection point 248B on the locking pin 244 and the first pivot axis "$P_F$" decreases, causing the locking pin 244 to move towards the locking member 216 and bringing the locking formation 218 into the extended engaged position with the locking member 216. In this manner, further rotation of the first object 212 about the first pivot axis "$P_F$", as shown in FIG. 4C, is checked.

Figure 5:
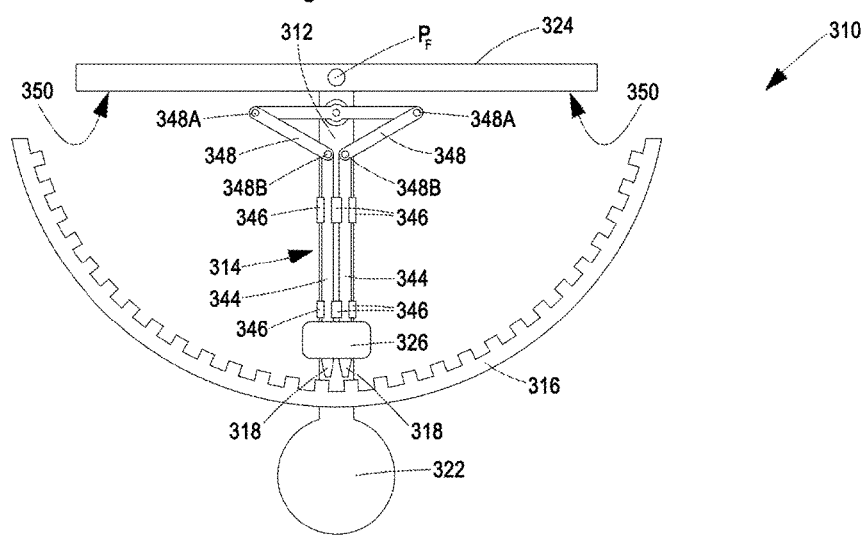
FIG. 5 is a side view of a fourth embodiment of a locking gimbal in accordance with the invention.

FIG. 5, with like references designating like parts, shows an alternative to the sliding locking pin embodiment of FIGS. 4A to 4C having a pair of locking pins 344 slidably mounted on the second pendulum like object 314 by guides 346, the locking pins 344 being configured to engage a locking member 316 located proximate the counterweight ends 322, 326 of the first and second pendulum-like objects 312, 314.

In use, as the first and second objects 312, 314 move into the second displaced condition, an abutment surface 350 of the first object 312 contacts a first end 348A of a connector 348 such that a force imparted thereon by the first object 312 is transmitted to the respective locking pin 344 connected to a second end 348B of the connector 348. In this manner, the respective locking pin 344 is forced into the extended engaged position with the locking member 316, thereby to check further rotation of the first object 312 about the first pivot axis "$P_F$".

Figure 6:
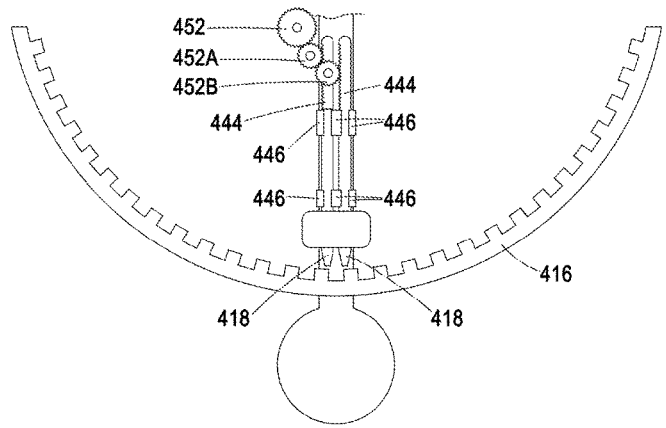
FIG. 6 is a side view of a variation of the fourth embodiment of the locking gimbal of FIG. 5.

Yet another variation of the double locking pin embodiment of FIG. 5 is illustrated in FIG. 6, wherein instead of connectors actuating movement of the locking pins 444, gears 452, 452A, 452B are used.

In respect of the embodiments illustrated in FIGS. 5 and 6, instead of the locking pins 344, 444 being slidably mounted on the second object as illustrated, it will be appreciated that they may be slidably mounted on the first object.

Figure 7A:
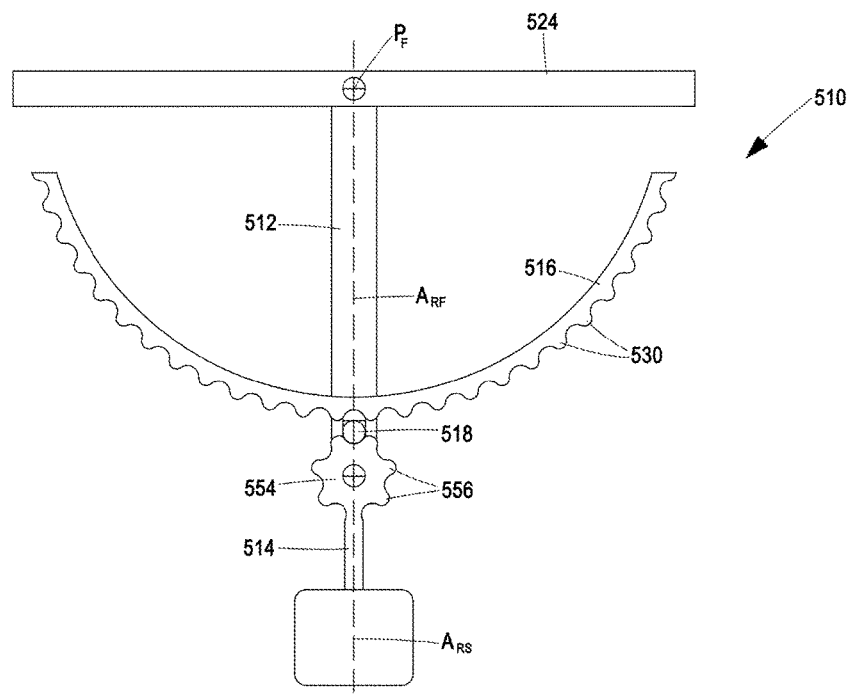
FIG. 7A-7B are side views of a fifth embodiment of a locking gimbal in accordance with the invention, FIG. 7A showing the locking gimbal in a first aligned condition and FIG. 7B showing the locking gimbal in a second displaced condition.
Figure 7B:
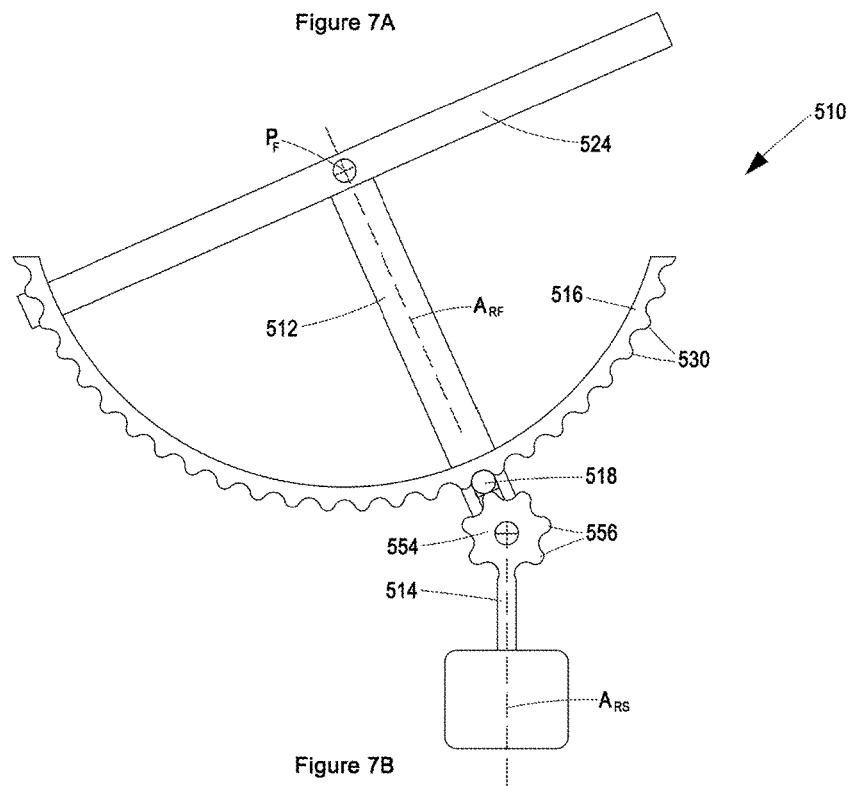
Figure 8A:
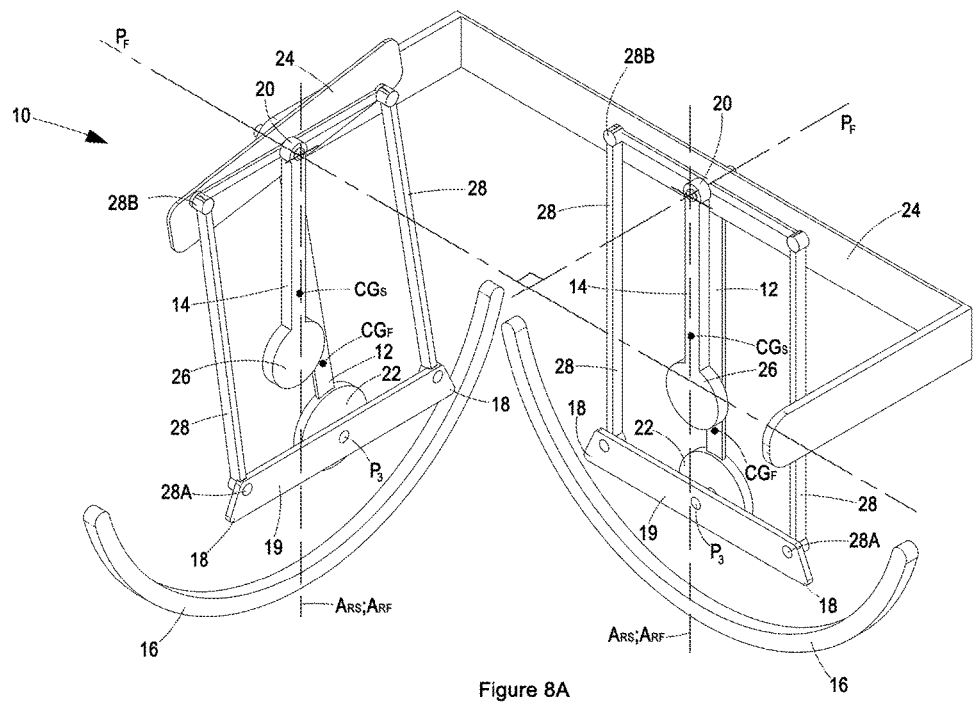
FIG. 8A is a perspective view of two of the locking gimbals of FIG. 1 angularly offset relative to one another by 90 degrees.
Figure 8B:
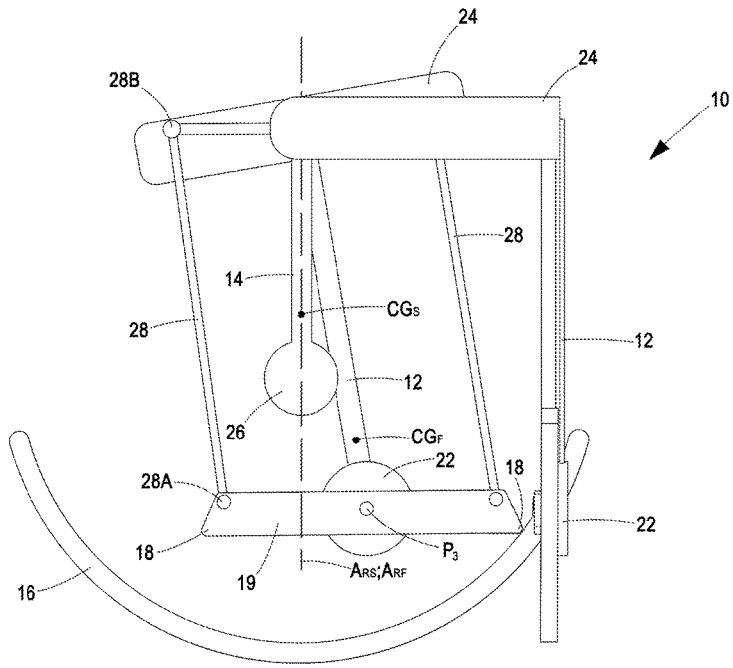
FIG. 8B is a side view of the two locking gimbals of FIG. 8A.

FIGS. 7A and 7B, with like references designating like parts, illustrate one more of many other possible alternative embodiments, where the second pendulum-like object 514 is pivotally supported at or near the free end of the first pendulum-like object 512.

The locking formation is in the form of a locking pin 518 configured to ride between a cog formation 554 on the second object 514 and the locking member 516. In the first aligned condition as shown in FIG. 7A, the locking pin 518 is received between projections 556 on the cog formation 554 such that the locking pin 518 is spaced from the locking member 516 in the disengaged position.

In the second displaced condition as shown in FIG. 7B, the locking pin 518 rides to the top of a respective projection 556 on the cog formation 554 of the second member 514, thereby placing the locking pin 518 into the engaged position with the locking member 516, such that the locking pin 518 is captured between respective projections 530 on the locking member 516 thereby checking any further rotation of the first object 512 about the first pivot axis "$P_F$".

Although the invention has been described above with reference to preferred embodiments, it will be appreciated that many modifications or variations of the invention are possible without departing from the spirit or scope of the invention. For example, the gimbal lock may be applied to applications beyond the application of transportation, i.e. manufacturing and industrial applications.

Furthermore, electronic devices and/or actuators could be employed for even greater responsiveness. Also, the second object, instead of being a pendulum, sliding or rolling object as described herein, could be any other similar mechanism relying on gravity to determine a level position. As previously mentioned herein, the gimbal lock may be applied in all three dimensions and is not limited to one dimension.

The invention claimed is:

1. A locking gimbal including:
   a first object pivotally connectible to a support, and being pivotable about a first pivot axis, wherein the center of gravity of the first object is spaced from the first pivot axis, and further wherein the first object defines a first reference axis passing through the first pivot axis and the center of gravity of the first object;
   a second object having a center of gravity movable along an arc centered substantially at a second axis and defining a second reference axis passing through the second axis and the center of gravity of the second object, the first and second objects being movable relative to one another between a first aligned condition, wherein the first and second reference axes are substantially aligned, and a second displaced condition, wherein the first and second reference axes are angularly displaced relative to one another;
   a locking member fixed in position relative to the support;
   a connector, wherein pivotal displacement of the first object relative to the second object to the displaced condition in a first direction causes movement of the connector to a driving position; and
   a locking formation associated with the connector such that movement of the connector to the driving position drives at least a portion of the locking formation from a disengaged position to an engaged position, wherein the locking member arrests further pivotal displacement of the first object in such first direction via the locking formation;

characterized in that the locking formation is operatively movable relative to both the first and the second objects.

2. A locking gimbal according to claim 1, wherein the first object is biased towards an in rest position in which at least one of: (i) a support surface of the first object is substantially level, and (ii) the center of gravity of the first object operatively comes to rest at a position underneath the first pivot axis, and further wherein in the in rest position, the first reference axis is substantially upright, the first object being biased towards the in rest position under its own weight or under the weight of a first counterweight connected thereto by a first pendulum arm such that the first object acts as a first pendulum.

3. A locking gimbal according to claim 1, wherein the second object is movable along a track connected to the first object, the second object being capable of rolling or sliding along the track, and further wherein the track is arcuate having a center located substantially at the second axis, the second axis being substantially co-linear with the first pivot axis.

4. A locking gimbal according to claim 3, wherein the locking formation is one or more formations on a locking aim pivotally mounted on the first object and pivotally movable relative thereto from the disengaged position into the engaged position by contact of the second object thereon in the second displaced condition.

5. A locking gimbal according to claim 1, wherein the second object is pivotally supported to act as a second pendulum, and the locking formation is a terminal end of one or more locking pins being movable between the engaged and disengaged positions wherein in the engaged position, the locking pin extends such that the locking formation thereof comes into engagement with the locking member when the first and second objects are in the second displaced condition, and wherein in the disengaged position, the locking pin is retracted such that the locking formation thereof is spaced from the locking member when the first and second objects are in the first aligned condition.

6. A locking gimbal according to claim 5, wherein the connector is co-operative between: (i) the first object and the locking pin; or (ii) the second object; and the locking pin; such that when the first and second objects are in the first aligned position, the locking pin is forced by the connector into the retracted disengaged position, and when the first and second objects are in the second displaced position, the locking pin is forced by the connector into the extended engaged position.

7. A locking gimbal according to claim 6, wherein the locking pin is slidably mounted on the first object and the connector comprises first and second ends, each of the first and second ends being pivotally connected to the locking pin and to the second object respectively, the locking pin being mounted on the first object and slidable relative thereto along an axis which remains substantially parallel with the first reference axis.

8. A locking gimbal according to claim 6, wherein
(i) the one or more locking pins are a pair of locking pins slidably mounted on the first or second object; and
(ii) the connector is a pair of connectors each being capable of actuating one of the locking pins;
characterized in that each of the connectors comprises a first end pivotally connected to one of the locking pins, and a second end configured to co-operatively engage the first object, thereby to transmit through the connector and on engagement between the first object and the second end of such connector, a corresponding force imparted thereon to the locking pin thereby driving the locking pin towards the retracted disengaged or extended engaged positions respectively, characterized in that the locking pins are mounted on the first or second object and slidable relative thereto along an axis which remains substantially parallel with the respective first and second reference axis.

9. A locking gimbal according to claim 6, wherein:
(i) the one or more locking pins are a pair of locking pins slidably mounted on the first or second object; and
(ii) the connector is
a plurality of gears for driving the locking pins, the gears being co-operatively engagable with the first object thereby to transmit through the gears and on engagement between the first object and at least one of such gears, a corresponding force imparted thereon to the locking pin thereby driving the locking pin towards the retracted disengaged or extended engaged positions respectively, characterized in that the locking pins are mounted on the first or second object and slidable relative thereto along an axis which remains substantially parallel with the respective first and second reference axis.

10. A locking gimbal according to claim 1, wherein the second object is pivotally supported on the first object and pivotable relative thereto about the second axis, the second axis being a second pivot axis spaced from the first pivot axis, and further wherein the locking formation is a locking pin configured to ride between a cog formation on the second object and the locking member, the locking pin being capable of riding freely along the locking member in the disengaged position when the first and second objects are in the first aligned condition, and of being captured between projections on the cog formation and the locking member in the engaged position when the first and second objects are in the second displaced condition, thereby to lock the first and second objects to the locking member and prevent rotation of the first object about the first pivot axis.

11. A locking gimbal according to claim 1, wherein the second object is pivotally supported about the second axis to act as a second pendulum such that the second axis is a second pivot axis, and further wherein the locking formation is one or more formations on a locking arm, the locking arm being pivotally mounted on the first object and pivotable relative thereto about a third pivot axis, characterized in that the second object is pivotally supportable on a second support such that the first and second pivot axes are spaced relative to one another, or alternatively, the second object is pivotally supportable on the support on which the first object is pivotally supportable such that the first and second pivot axes are co-linear.

12. A locking gimbal according to claim 11, wherein the connector is one or more connectors having first and second ends, the first end thereof being pivotally connected to a first connection point on the locking arm and a second end thereof being pivotally connected to a second connection point on the second object, wherein the first connection point and the third pivot axis lie on a primary plane and the second connection point and the second pivot axis lie on a secondary plane, the primary and secondary planes in use remaining substantially parallel throughout the range of pivotal movement of the first and second objects, and further wherein the center of gravity of the second object and the second pivot axis lie on a transverse plane being substantially perpendicular to the secondary plane, characterized in that the second object is pivotally supportable such that the first and second pivot axes axis are spaced relative to one another or are co-linear.

13. A locking gimbal according to claim 1, wherein the second object, acting as a second pendulum, comprises a second counterweight pivotally supported on a second pendulum arm.

14. A locking gimbal according to claim 5, wherein a first length, as measured between the first pivot axis and the center of gravity of the first object, and a second length, as measured between the axis about which the second object is pivotally supported and the center of gravity of the second object, are unequal such that a period of oscillation of the first object is different to a period of oscillation of the second object.

15. A locking gimbal according to claim 2, wherein the center of gravity of the first object and the first pivot axis lie on a plane being substantially perpendicular to the support surface of the first object.

16. A locking gimbal according to claim 1, wherein the locking member is arcuate with its center substantially coinciding with the first pivot axis and having repeating projections spaced from one another circumferentially there along.

17. A locking gimbal according to claim 16, wherein the locking member is two or more spaced parallel locking members orientated relative to one another such that the projections on one of the locking members are staggered relative to the projections on the other locking members thereby increasing the engaging responsiveness of the locking formation on the locking member.

18. A locking gimbal according to claim 4, wherein the locking formation is movably supported on the locking arm and movable relative thereto such that the locking formation engages the locking member in the engaged position and disengages the locking member in the disengaged position.

19. A locking gimbal according to claim 18, wherein the locking formation is movably supported on the locking arm and movable relative thereto such that the locking formation engages the locking member in the engaged position and disengages the locking member in the disengaged position, the locking formation being movably supported on a swivel pin on the locking formation or the locking arm, the swivel pin being captured within a swivel slot defined on the other of the locking formation or the locking arm, and further wherein the swivel pin and swivel slot enable the locking formation to swivel and slide relative to the locking arm, with the range of motion of the locking engagement member being limited by the length of the swivel slot and corresponding abutment formations capable of abutting one another in the engaged position.

20. A locking gimbal according to claim 2, wherein:
the first pivot axis is at least two gimbal axes about which the first object is pivotally supported, the at least two gimbal axes being angularly offset relative to one another thereby to maintain at least one of the first object and the support surface thereof substantially level; and
the locking formation is radially movable relative to the first pivot axis between the engaged position, wherein the locking formation and the locking member operatively make contact, and the disengaged position, wherein the locking formation and the locking member operatively make less contact or are spaced.

21. A locking gimbal according to claim 20, wherein the at least two gimbal axes are angularly offset relative to one another by 90 degrees, and further wherein in the first aligned condition, the first and second reference axes are at least one of substantially co-planar and substantially co-linear.

* * * * *